United States Patent
Fujioka

(10) Patent No.: US 10,094,271 B2
(45) Date of Patent: Oct. 9, 2018

(54) CONTROL APPARATUS FOR INTERNAL COMBUSTION ENGINE

(71) Applicant: HONDA MOTOR CO., LTD., Tokyo (JP)

(72) Inventor: Nobuyuki Fujioka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 449 days.

(21) Appl. No.: 14/852,627

(22) Filed: Sep. 14, 2015

(65) Prior Publication Data

US 2016/0084152 A1    Mar. 24, 2016

(30) Foreign Application Priority Data

Sep. 18, 2014    (JP) ................................. 2014-189587

(51) Int. Cl.
*F02D 23/00*      (2006.01)
*F02B 33/44*      (2006.01)
(Continued)

(52) U.S. Cl.
CPC ........ *F02B 37/183* (2013.01); *F02D 41/0007* (2013.01); *F02D 41/1408* (2013.01);
(Continued)

(58) Field of Classification Search
CPC .... F02B 37/18–37/186; F02D 41/0007; F02D 41/22
See application file for complete search history.

(56) References Cited

U.S. PATENT DOCUMENTS 4,248,047 A * 2/1981 Sumi ..................... F02B 37/186
60/602
4,873,961 A * 10/1989 Tanaka .................. F02B 33/443
123/492
(Continued)

FOREIGN PATENT DOCUMENTS

JP       4952847 B2     6/2012
JP       2014148965 A *  8/2014 ............ F02B 37/183
WO   WO 2012/086078     6/2012

OTHER PUBLICATIONS

Japanese Office Action for corresponding JP Application No. 2014-189587, dated May 31, 2016 (w/ English machine translation).

*Primary Examiner* — Ngoc T Nguyen
(74) *Attorney, Agent, or Firm* — Mori & Ward, LLP

(57) ABSTRACT

A control apparatus for an internal combustion engine includes an exhaust gas concentration parameter sensor, a cylinder gas amount parameter acquisition device, an air-fuel ratio controller, an operation status determination device, and a determination value setting device. The air-fuel ratio controller is to perform an air-fuel ratio fluctuation control to control an air-fuel ratio in the internal combustion engine to fluctuate in a predetermined state. The operation status determination device is to determine an operation status of the internal combustion engine or an auxiliary device of the internal combustion engine based on an exhaust gas concentration parameter detected by the exhaust gas concentration parameter sensor in a case where an amount of a cylinder gas represented by a cylinder gas amount parameter acquired by the cylinder gas amount parameter acquisition device is equal to or larger than a predetermined determination value while the air-fuel ratio fluctuation control is being performed.

13 Claims, 12 Drawing Sheets

(51) Int. Cl.
*F02B 37/18* (2006.01)
*F02D 41/00* (2006.01)
*F02D 41/14* (2006.01)
*F02D 41/22* (2006.01)
*F02D 41/18* (2006.01)

(52) U.S. Cl.
CPC ..... *F02D 41/1439* (2013.01); *F02D 41/1456* (2013.01); *F02D 41/22* (2013.01); *F02D 41/18* (2013.01); *F02D 2041/1432* (2013.01); *F02D 2200/0402* (2013.01); *Y02T 10/144* (2013.01); *Y02T 10/40* (2013.01)

(56) References Cited

U.S. PATENT DOCUMENTS

| | | | | |
|---|---|---|---|---|
| 4,909,035 | A * | 3/1990 | Tadokoro | F02B 37/025 60/602 |
| 10,006,382 | B2 * | 6/2018 | Tsunooka | F02D 41/0007 |
| 2008/0077304 | A1 * | 3/2008 | Suzuki | F02B 37/013 701/102 |
| 2011/0126812 | A1 | 6/2011 | Miyashita | |

* cited by examiner

CONTROL APPARATUS FOR INTERNAL COMBUSTION ENGINE

CROSS-REFERENCE TO RELATED APPLICATIONS

The present application claims priority under 35 U.S.C. § 119 to Japanese Patent Application No. 2014-189587, filed Sep. 18, 2014, entitled "Control Apparatus For Internal Combustion Engine." The contents of this application are incorporated herein by reference in their entirety.

BACKGROUND

1. Field

The present disclosure relates to a control apparatus for an internal combustion engine.

2. Description of the Related Art

To date, a feature described in Japanese Patent No. 4952847 is well known as a control apparatus for an internal combustion engine. This internal combustion engine is provided with a turbocharger that has a turbine provided in an exhaust passage, a wastegate valve that opens and closes a bypass passage for bypassing the turbine, an exhaust gas purification catalyst that purifies exhaust gas flowing in the exhaust passage, and a wide-area air-fuel ratio sensor and an $O_2$ sensor respectively provided upstream and downstream of the exhaust gas purification catalyst.

As controls for determining whether or not the exhaust gas purification catalyst is deteriorated, the control apparatus performs a full-close control process for keeping the wastegate valve in a full-closed state, and an air-fuel ratio control process for determining deterioration. In the air-fuel ratio control process for determining deterioration, the air-fuel ratio (hereinafter called "the pre-catalyst air-fuel ratio") of exhaust gas supplied to the exhaust gas purification catalyst is controlled so as to repeat inversion of the ratio between a predetermined lean value and a predetermined rich value.

While performing the full-close control process and air-fuel ratio control process for determining deterioration, the control apparatus calculates oxygen storage capacity OSC of the exhaust gas purification catalyst and determines deterioration of the exhaust gas purification catalyst on the basis of the calculation result of the oxygen storage capacity OSC. The oxygen storage capacity OSC is calculated by integrating the amount of oxygen release per unit time. In this case, the full-close control process is performed in order to avoid a situation where the wide-area air-fuel ratio sensor cannot accurately detect timing of change in the pre-catalyst air-fuel ratio while the wastegate valve is being opened, and as a result the accuracy of the oxygen storage capacity OSC calculation is reduced.

SUMMARY

According to one aspect of the present invention, a control apparatus for an internal combustion engine provided with a turbocharger having a turbine provided in an exhaust passage, and a wastegate valve that changes kinetic energy received by the turbine from exhaust gas by opening/closing a bypass passage for bypassing the turbine of the turbocharger includes an exhaust gas concentration parameter sensor, a cylinder gas amount parameter acquisition unit, an air-fuel ratio control unit, an operation status determination unit, and a determination value setting unit. The exhaust gas concentration parameter sensor is provided downstream of the turbine in the exhaust passage and detects an exhaust gas concentration parameter which indicates a concentration of a predetermined component, including oxygen, in the exhaust gas. The cylinder gas amount parameter acquisition unit acquires a cylinder gas amount parameter which indicates an amount of a cylinder gas in a cylinder of the internal combustion engine. The air-fuel ratio control unit performs an air-fuel ratio fluctuation control process for controlling an air-fuel ratio of the internal combustion engine to fluctuate in a predetermined manner. The operation status determination unit determines an operation status of the internal combustion engine or an auxiliary device of the internal combustion engine by using the detected exhaust gas concentration parameter when the cylinder gas amount indicated by the acquired cylinder gas amount parameter is equal to or larger than a predetermined determination value, while the air-fuel ratio fluctuation control process is being performed. The determination value setting unit sets the predetermined determination value to a larger value as the opening of the wastegate valve becomes larger.

According to another aspect of the present invention, a control apparatus for an internal combustion engine includes an exhaust gas concentration parameter sensor, a cylinder gas amount parameter acquisition device, an air-fuel ratio controller, an operation status determination device, and a determination value setting device. The exhaust gas concentration parameter sensor is provided in an exhaust passage to detect an exhaust gas concentration parameter which represents a concentration of a predetermined component including oxygen in an exhaust gas. The cylinder gas amount parameter acquisition device is to acquire a cylinder gas amount parameter which represents an amount of a cylinder gas in a cylinder of the internal combustion engine which includes a turbocharger having a turbine provided in the exhaust passage and which includes a wastegate valve to open or close a bypass passage to bypass the turbine of the turbocharger so as to change kinetic energy transmitted from the exhaust gas to the turbine. The air-fuel ratio controller is to perform an air-fuel ratio fluctuation control to control an air-fuel ratio in the internal combustion engine to fluctuate in a predetermined state. The operation status determination device is to determine an operation status of the internal combustion engine or an auxiliary device of the internal combustion engine based on the exhaust gas concentration parameter detected by the exhaust gas concentration parameter sensor in a case where the amount of the cylinder gas represented by the cylinder gas amount parameter acquired by the cylinder gas amount parameter acquisition device is equal to or larger than a predetermined determination value while the air-fuel ratio fluctuation control is being performed. The determination value setting device is to increase the predetermined determination value as an opening of the wastegate valve increases.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
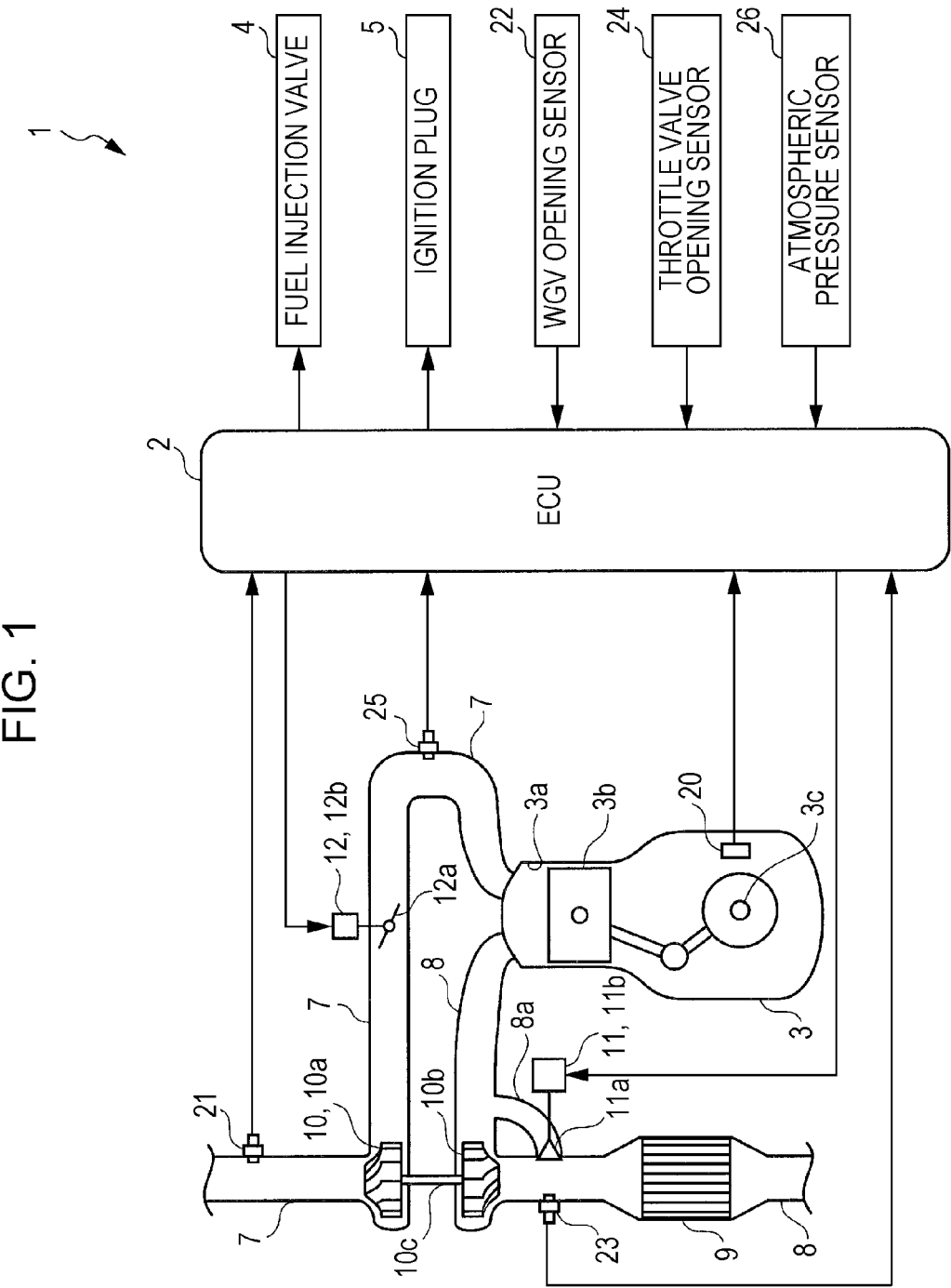
FIG. 1 is a schematic diagram illustrating a configuration of a control apparatus according to an embodiment of the present application and an internal combustion engine to which the control apparatus is applied.

The embodiments will now be described with reference to the accompanying drawings, wherein like reference numerals designate corresponding or identical elements throughout the various drawings.

A control apparatus for an internal combustion engine according to an embodiment of the present application will be explained with reference to the accompanying drawings. As illustrated in FIG. 1, a control apparatus 1 is applied to an internal combustion engine (hereinafter referred to as "engine") 3, and is provided with an engine control unit (ECU) 2. The ECU 2 performs various control processes, as described below.

The engine 3 is an in-line four cylinder type having four sets of a cylinder 3a and a piston 3b (only one set thereof is illustrated in the drawing) and is mounted in a vehicle (not shown) as a power source. The engine 3 is provided with a fuel injection valve 4 and an ignition plug 5 for each cylinder 3a (only one of each is illustrated in the drawing). Each fuel injection valve 4 is electrically connected to the ECU 2, and valve opening time and the valve opening timing thereof, that is, the fuel injection amount and the injection timing thereof, are controlled by the ECU 2. Each ignition plug 5 is also electrically connected to the ECU 2, and the ignition timing thereof is controlled by the ECU 2.

The engine 3 is also provided with a crank angle sensor 20. The crank angle sensor 20 outputs a CRK signal and a TDC signal, which are pulse signals, to the ECU 2 in response to rotation of a crank shaft 3c. In the CRK signal, a single pulse is output for each predetermined crank angle (2°, for example), and the ECU 2 calculates the rotational speed NE of the engine 3 (hereinafter referred to as "engine rotation speed") on the basis of the CRK signal. The TDC signal indicates that the piston 3b of each cylinder 3a is positioned at a predetermined crank angle slightly in front of the TDC position during an intake stroke, and a single pulse is output for every predetermined crank angle.

Meanwhile, an intake passage 7 of the engine 3 is provided with an intake air temperature sensor 21, a turbocharger 10, and a throttle valve mechanism 12 in this order from the upstream side. The intake air temperature sensor 21 detects the temperature of air (hereinafter referred to as "intake air temperature") TA inside the intake passage 7 and outputs a detection signal representing the intake air temperature TA to the ECU 2.

The turbocharger 10 is provided with a compressor 10a installed in the intake passage 7, a turbine 10b installed in the exhaust passage 8, a shaft 10c for integrally connecting the compressor 10a and the turbine 10b, and a wastegate valve mechanism 11.

In the turbocharger 10, when the turbine 10b is driven to rotate by exhaust gas in the exhaust passage 8, the compressor 10a rotates together with the turbine 10b, and thereby the intake air in the intake passage 7 is compressed. That is, a supercharging operation is performed.

The wastegate valve mechanism 11 is formed of a wastegate valve 11a and a wastegate (WG) actuator 11b. The wastegate valve 11a opens/closes a bypass line 8a which bypasses the turbine 10b of the exhaust passage 8, and is provided at an opening section where a downstream end of the bypass line 8a merges with the exhaust passage 8. The wastegate valve 11a changes the flow rate of exhaust gas that bypasses the turbine 10b and flows through the bypass line 8a, that is, the flow rate of exhaust gas that drives the turbine 10b, by changing the opening thereof. Consequently, the supercharging pressure is changed.

The WG actuator 11b is an electric type electrically connected to the ECU 2 and that changes the opening of the wastegate valve 11a when a control input signal from ECU 2 is supplied thereto. Consequently, the supercharging pressure is controlled.

Meanwhile, a wastegate valve opening sensor (hereinafter referred to as "WGV opening sensor") 22 is provided in the vicinity of the wastegate valve 11a. The WGV opening sensor 22 detects the opening (hereinafter referred to as "wastegate valve opening") WG of the wastegate valve 11a and outputs a detection signal representing the wastegate valve opening WG to the ECU 2.

Figure 2:
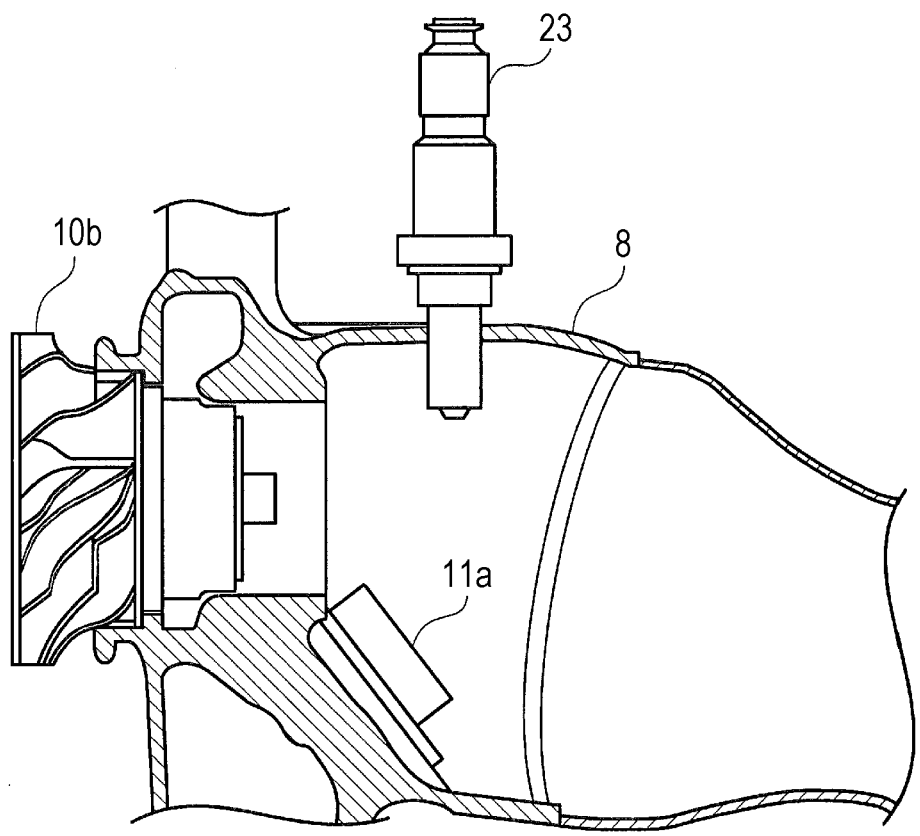
FIG. 2 is a cross-section view illustrating a configuration around an LAF sensor in an exhaust passage.

As illustrated in FIGS. 1 and 2, a linear air-fuel (LAF) sensor 23 is provided downstream of the turbine 10b of the exhaust passage 8 and in the vicinity of the wastegate valve 11a. The LAF sensor 23 is formed of a zirconia element, a platinum electrode, and so on, linearly detects the oxygen concentration of exhaust gas flowing in the exhaust passage 8 in a wide range of the air-fuel ratio from a rich range, which is richer than a theoretical air-fuel ratio, to an extremely lean range, and outputs a detection signal representing the oxygen concentration to the ECU 2.

On the basis of the value of the detection signal output from the LAF sensor 23, the ECU 2 calculates a detected equivalent ratio KACT representing the equivalent ratio of the exhaust gas. Note that, in the present embodiment, the LAF sensor 23 corresponds to the exhaust gas concentration parameter sensor, and the detected equivalent ratio KACT corresponds to the exhaust gas concentration parameter.

In the engine 3, the LAF sensor 23 is disposed in the vicinity of the wastegate valve 11a, and the LAF sensor 23 and the turbine 10b are installed in such a manner that the central axis of each is positioned on a plane extending along the cross section in FIG. 2. Meanwhile, the central axis of the wastegate valve 11a and the central axis of the opening section of the bypass line 8a are positioned so as to be shifted to a deeper side in FIG. 2. According to this configuration, exhaust gas that has passed through the turbine 10b flows while being brought into direct contact with the LAF sensor 23, whereas exhaust gas that has passed through the wastegate valve 11a flows with little or no contact with the LAF sensor 23, and then merges with the exhaust gas that has passed through the turbine 10b.

An exhaust gas purification catalyst 9 is provided downstream of the LAF sensor 23 of the exhaust passage 8. The exhaust gas purification catalyst 9 is a three-way catalyst type.

The throttle valve mechanism 12 is provided with a throttle valve 12a and a TH actuator 12b that drives the throttle valve 12a to open/close. The throttle valve 12a is rotatably installed in the intake passage 7 and changes the flow rate of an air flowing through the throttle valve 12a by changing the opening thereof in response to rotation.

The TH actuator 12b is formed by combining a motor (not shown) connected to the ECU 2 with a gear mechanism (not shown), and the TH actuator 12b changes the opening of the throttle valve 12a by being controlled by a control input signal received from the ECU 2.

In the vicinity of the throttle valve 12a, a throttle valve opening sensor 24 formed of a potentiometer, for example, is provided. The throttle valve opening sensor 24 detects the opening (hereinafter referred to as "throttle valve opening) TH of the throttle valve 12a and outputs a detection signal representing the throttle valve opening TH to the ECU 2.

An intake air pressure sensor 25 is provided downstream of the throttle valve 12a of the intake passage 7. The intake air pressure sensor 25 detects the pressure (hereinafter referred to as "intake air pressure") PB in the intake passage 7 and outputs a detection signal representing the intake air pressure PB to the ECU 2. The intake air pressure PB is detected as an absolute pressure.

The engine 3 is provided with an EGR device (not shown), and by means of the EGR device, part of the exhaust gas in the exhaust passage 8 is returned to the intake passage 7.

An atmospheric pressure sensor 26 is connected to the ECU 2. The atmospheric pressure sensor 26 is formed of a semiconductor pressure sensor, detects the atmospheric pressure PA, and outputs a detection signal representing the atmospheric pressure PA to the ECU 2.

The ECU 2 is formed of an embedded system having a CPU (not shown), a RAM (not shown), a ROM (not shown), an I/O interface (not shown), and so on, and executes various control processes according to the detection signals output by various sensors 20 to 26, as described below.

Note that, in the present embodiment, the ECU 2 corresponds to the cylinder gas amount parameter acquisition unit, an air-fuel ratio control unit, an operation status determination unit, and a determination value setting unit.

Next, first and second imbalance determination processes to be executed by the ECU 2 and the execution condition determination processes thereof will be explained below. The first and second imbalance determination processes are used to determine whether or not an imbalance in the air-fuel ratios is occurring among the four cylinders 3a by using a determination method proposed by the applicant of the present application in Japanese Unexamined Patent Application Publication No. 2013-253606, the entire contents of which are incorporated herein by reference.

Note that, in the explanation below, a condition in which an imbalance in the air-fuel ratios is occurring among the four cylinders 3a is called "the imbalance condition of the air-fuel ratio", and the first and second imbalance determination processes are collectively and appropriately called "imbalance determination processes". Furthermore, various calculated/set values described in the following explanation are to be stored in the RAM of the ECU 2.

First, an execution condition determination process will be explained with reference to FIG. 3. The execution condition determination process determines whether or not an execution condition of the imbalance determination processes is fulfilled, and is executed by the ECU 2 at a predetermined control cycle $\Delta T$. The control cycle $\Delta T$ is set to a value that is obtained by converting the primary frequency of the rotational speed NE to duration. Note that, the various calculated/set values described in the following explanation are to be stored in the RAM of the ECU 2.

Figure 3:
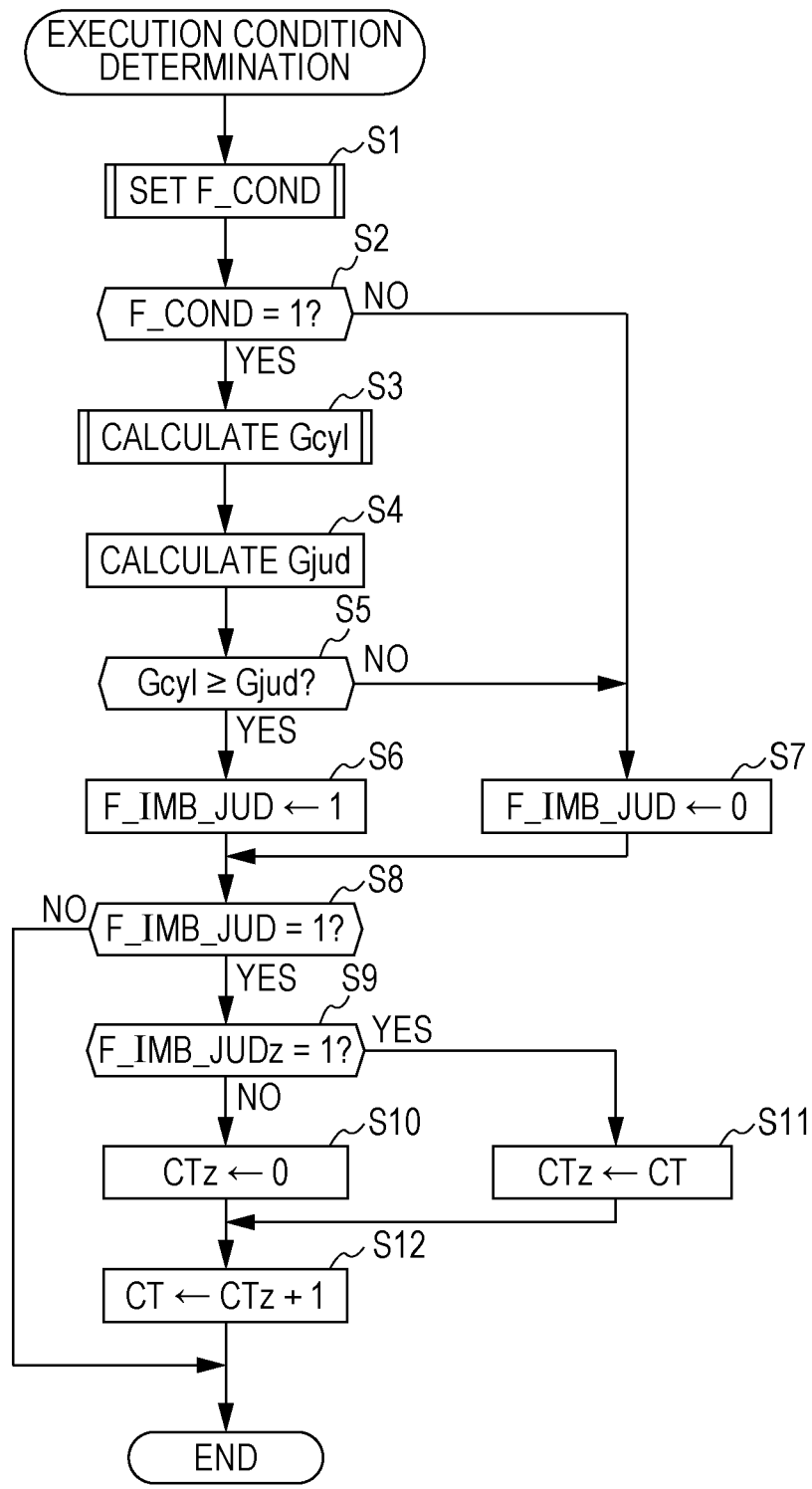
FIG. 3 is a flowchart illustrating an execution condition determination process.

As illustrated in FIG. 3, initially in step 1 ("step" is abbreviated as "S" in the drawings), the setting process of the various conditions flag F_COND is executed. The various conditions flag F_COND indicates whether or not execution conditions, except those of step 5, which will be described later, of the imbalance determination processes are fulfilled. In this setting process, the various conditions flag F_COND is set to "1" if all of the following conditions (C1) to (C3) are fulfilled, and is set to "0" if not.

(C1) The engine rotational speed NE and the intake air pressure PB are in predetermined ranges suitable for the imbalance determination processes. (C2) The LAF sensor 23 operates normally and is activated. (C3) The variations in engine rotational speed NE and intake air pressure PB are smaller than predetermined values, and occur under stable operation conditions.

Next, in step 2, it is determined whether or not the various conditions flag F_COND is "1". If the determination result is YES, the flow proceeds to step 3, and a process of calculating a cylinder gas amount GCYL, as a cylinder gas amount parameter, is executed. The cylinder gas amount GCYL corresponds to the total amount of gas to be placed in a cylinder 3a, and more specifically, the cylinder gas amount GCYL is calculated by using a calculation method illustrated in FIG. 4. This calculation method is derived from a method in which air passing through the throttle valve 12a is considered a compressible fluid and insulated fluid, and the throttle valve 12a is considered to be a nozzle.

Note that, in the following explanation, each discrete data piece with a sign (k) indicates that the data is sampled or calculated in synchronization with a control cycle $\Delta T$, and the sign k (k is a positive integer) indicates the order of the sampling or the calculation cycle of each discrete data piece. For example, sign k indicates that the value (hereinafter referred to as "current value") is sampled or calculated at the current control timing, and sign k−1 indicates that the value (hereinafter referred to as "previous value") is sampled or calculated at the previous control timing. In the explanation below, the sign (k) is omitted, as appropriate, in each discrete data piece.

Figure 4:
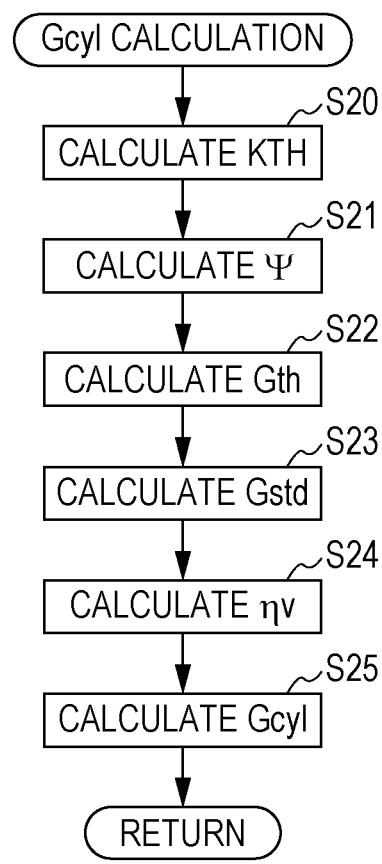
FIG. 4 is a flowchart illustrating a process for calculating a cylinder gas amount GCYL.
Figure 5:
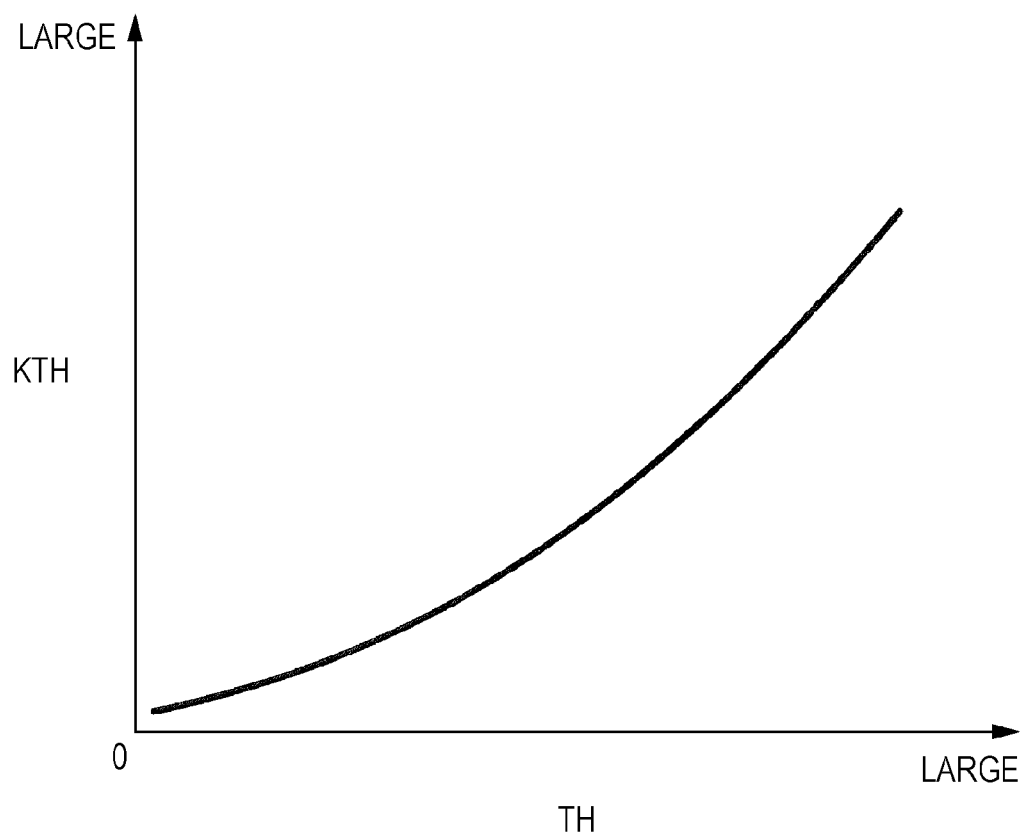
FIG. 5 is an example of a map used in calculation of an opening function KTH.

As illustrated in FIG. 4, initially in step 20, an opening function KTH is calculated by searching a map illustrated in FIG. 5 according to the throttle valve opening TH.

Figure 6:
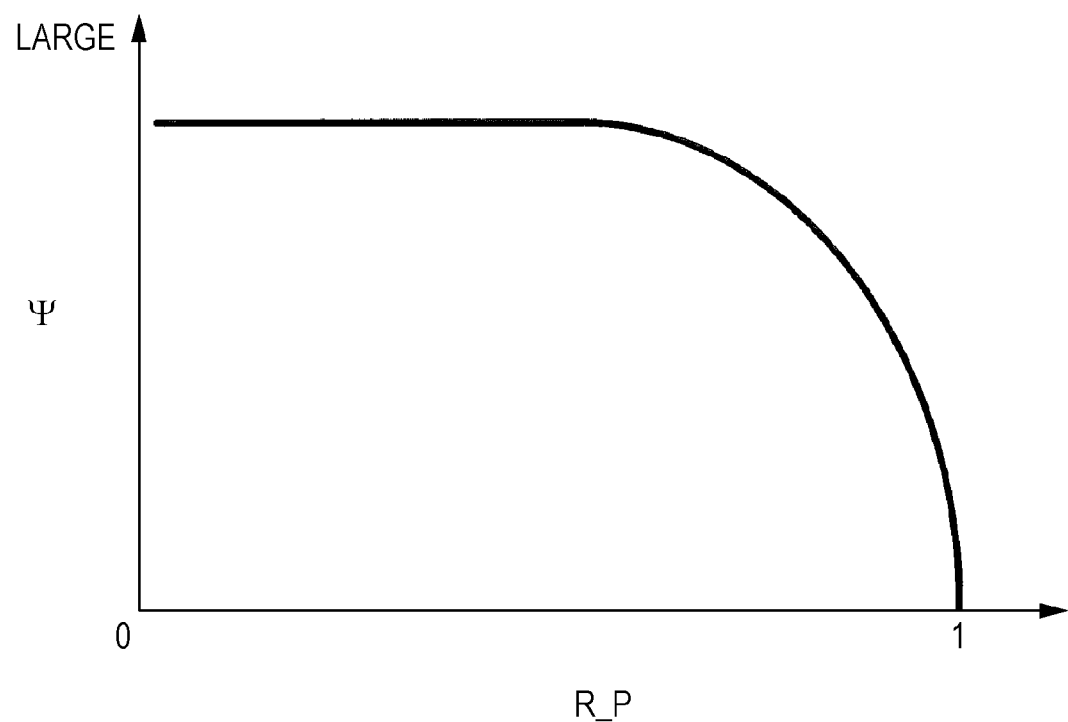
FIG. 6 is an example of a map used in calculation of a flow rate function $\Psi$.

Next, the flow proceeds to step 21, and a flow rate function $\Psi$ is calculated by searching a map illustrated in FIG. 6 according to a pressure ratio R_P (=PB/PA).

In step 22 following step 21, a passing air amount Gth is calculated by using the following formula 1.

$$Gth(k) = \frac{KTH(k) \cdot PA(k) \cdot \Psi(k)}{\sqrt{R \cdot TA(k)}} \qquad (1)$$

The passing air amount Gth corresponds to the amount of air passing through the throttle valve 12a, and R in the formula 1 is a gas constant.

Next, the process proceeds to step 23, and a theoretical cylinder gas amount Gstd is calculated by using the following formula 2.

$$Gstd(k) = \frac{PB(k) \cdot Vcyl}{R \cdot TA(k)} \quad (2)$$

The theoretical cylinder gas amount Gstd corresponds to the theoretical value of the cylinder gas amount GCYL, and the formula 2 is derived on the basis of the state equation of gas. In addition, Vcyl in the formula 2 is cylinder volume.

In step 24, a filling efficiency rev is calculated by using the following formula 3.

$$\eta V(k) = \frac{Gcyl(k-1)}{Gstd(k)} \quad (3)$$

In step 25 following step 24, the cylinder gas amount GCYL is calculated by using a weighted average operation shown in the following formula 4, and the GCYL calculation process is terminated.

$$Gcyl(k) = \frac{Vcyl \cdot \eta v(k)}{Vin} \cdot Gth(k) + \left[1 - \frac{Vcyl \cdot \eta v(k)}{Vin}\right] \cdot Gcyl(k-1) \quad (4)$$

Vin in the formula 4 represents a passage volume corresponding to the volume of the intake passage 7 from the throttle valve 12*a* to an intake valve.

Figure 7:
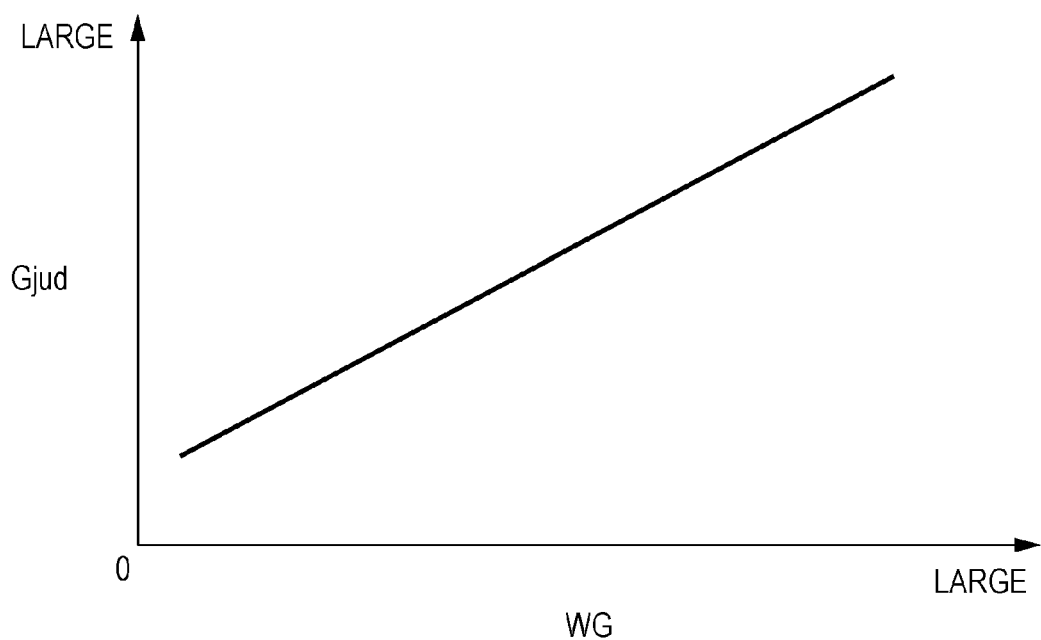
FIG. 7 is an example of a map used in calculation of a gas amount determination value Gjud.

Reference is now returned to FIG. 3. After the cylinder gas amount GCYL is calculated as described above in step 3, the process proceeds to step 4 to calculate a gas amount determination value Gjud (a predetermined determination value) by searching a map illustrated in FIG. 7, according to the wastegate valve opening WG. As illustrated in FIG. 7, in this map, the gas amount determination value Gjud is increased as the wastegate valve opening WG increases. This setting is made in order to address a situation where, as the wastegate valve opening WG increases, the amount of exhaust gas supplied to the LAF sensor 23 via the turbine 10*b* decreases.

Next in step 5, it is determined whether or not the cylinder gas amount GCYL is equal to or larger than the gas amount determination value Gjud. If the determination result is YES, it is determined that the execution conditions of the imbalance determination processes are fulfilled, and, in order to represent the fulfillment, the process proceeds to step 6 to set an imbalance determination flag F_IMB_JUD to "1".

If the determination result of step 2 or step 5 is NO, that is, if any one of the abovementioned conditions (C1) to (C3) is not fulfilled, or if the cylinder gas amount GCYL is less than the gas amount determination value Gjud, it is determined that the execution conditions of the imbalance determination processes are not fulfilled, and in order to represent the fulfillment failure, the process proceeds to step 7 to set the imbalance determination flag F_IMB_JUD to "0".

In step 8 following step 6 or step 7, it is determined whether or not the imbalance determination flag F_IMB_JUD is "1". If the determination result is NO, the process is terminated immediately.

On the other hand, if the determination result of step 8 is YES, the process proceeds to step 9, and it is determined whether or not the previous value of the imbalance determination flag F_IMB_JUDz is "1". If this determination result is NO, and if the current control timing is a timing when the execution conditions of the imbalance determination processes are fulfilled, the process proceeds to step 10, and a previous value CTz of the count value of a fluctuation control counter is set to 0.

If the determination result of step 9 is YES, and if the execution conditions of the imbalance determination processes have been fulfilled at a control timing before the previous timing, the process proceeds to step 11, and a previous value CTz of a count value of the fluctuation control counter is set to a count value CT of the fluctuation control counter stored in the RAM.

In step 12 following step 10 or step 11, the count value CT of the fluctuation control counter is set to CTz+1, which is the sum of the previous value CTz and 1, and then the process is subsequently terminated.

As described above, when executing the execution condition determination process of FIG. 3, the count value CT of the fluctuation control counter is incremented by 1 while the imbalance determination flag F_IMB_JUD=1 is being fulfilled. In this case, as described later, a value ΔT·CT represents the execution duration of the air-fuel ratio fluctuation control process because the air-fuel ratio fluctuation control process is executed while the imbalance determination flag F_IMB_JUD=1 is being fulfilled.

Next, an oscillation value calculation process will be explained with reference to FIG. 8. This process is for calculating an oscillation value KCMD_i, which is a target value of the detected equivalent ratio KACT when an air-fuel ratio fluctuation control process, which will be described later, is executed, and is executed at a predetermined control cycle ΔT by the ECU 2.

Figure 8:
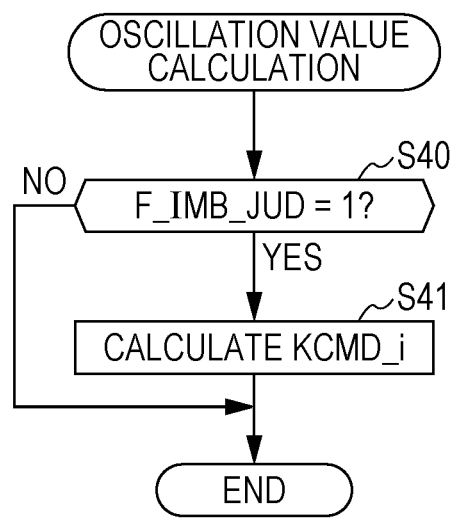
FIG. 8 is a flowchart illustrating a process for calculating an oscillation value KCMD_i.

As illustrated in FIG. 8, it is determined whether or not the imbalance determination flag F_IMB_JUD is "1" in step 40. If the determination result is NO, the process is terminated immediately.

Figure 9:
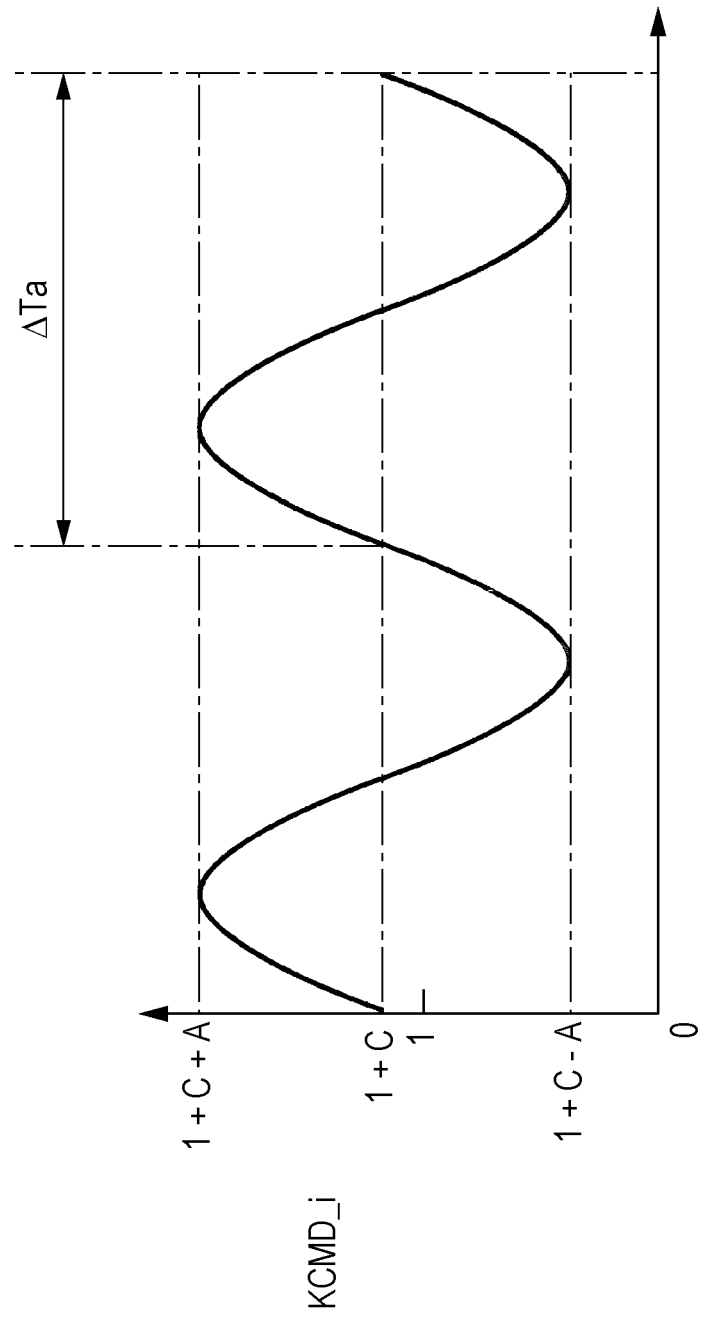
FIG. 9 is a diagram illustrating a calculation result of the oscillation value KCMD_i obtained by the calculation process in FIG. 8.

On the other hand, if the determination result of step 40 is YES, and if the execution conditions of the imbalance determination are fulfilled, the process proceeds to step 41, and after the oscillation value KCMD_i is calculated, the process is terminated. The oscillation value KCMD_i is calculated as an equivalent ratio, and, more specifically, as a sine wave signal that fluctuates with an amplitude A at a cycle ΔTa with the value one+C at center, as illustrated in FIG. 9. In this case, the values C and A are set to predetermined positive values, and the cycle Ta is set to a value larger than a value obtained by converting the 0.5th-order frequency F0.5 to duration, described later. That is, an oscillation value frequency Fa, which is obtained by converting the cycle Ta to frequency, is set to a value lower than the 0.5th-order frequency F0.5.

Next, a fuel control process will be explained with reference to FIG. 10. This fuel control process calculates a fuel injection amount TOUT and an injection timing θINJ of the fuel injection valve 4 and is executed by the ECU 2 at a timing synchronized with generation of a TDC signal.

Figure 10:
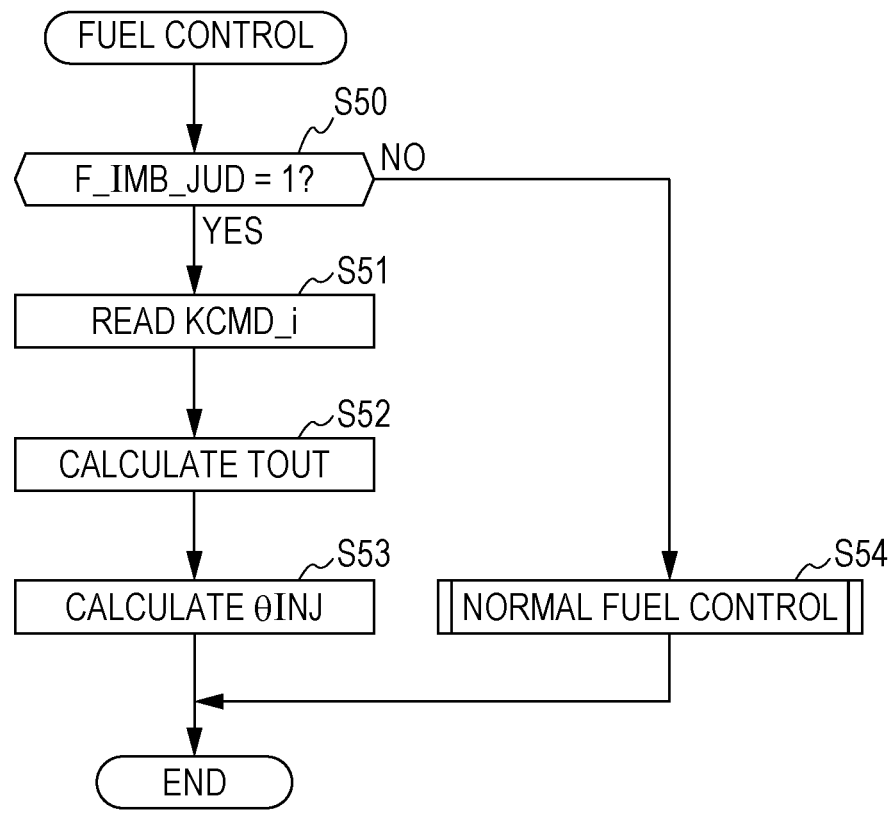
FIG. 10 is a flowchart illustrating a fuel control process.

As illustrated in FIG. 10, initially in step 50, it is determined whether or not the imbalance determination flag F_IMB_JUD is "1". If the determination result is YES, it is determined whether or not the air-fuel ratio fluctuation control process needs to be executed as preparation for executing the imbalance determination processes, and the process then proceeds to step 51 to read the oscillation value KCMD_i stored in the RAM. That is, the oscillation value KCMD_i is sampled.

Next, the process proceeds to step 52, and the fuel injection amount TOUT is calculated in such a manner that the detected equivalent ratio KACT is set to the oscillation value KCMD_i by using a predetermined feedback control algorithm.

In step 53, the injection timing θINJ is calculated by searching a map (not shown) according to the engine rotational speed (NE) and the fuel injection amount TOUT, and the process is then terminated.

On the other hand, if the determination result in step 50 is NO, the process proceeds to step 54 to execute a normal fuel control process. In the normal fuel control process (the content thereof is not illustrated in the drawing), a target equivalent ratio KCMD is calculated according to the engine rotational speed NE and a pedaling amount of an accelerator, and the fuel injection amount TOUT and the injection timing θINJ are calculated in such a manner that the detected equivalent ratio KACT is set to the target equivalent ratio KCMD. After the normal fuel control process is executed in step 54, as described above, the process is terminated.

In the present embodiment, the control process of steps 51 to 53 corresponds to the air-fuel ratio fluctuation control process, and by executing the air-fuel ratio fluctuation control process, the equivalent ratio of exhaust gas is controlled to follow the oscillation value KCMD_i. As a result, the detected equivalent ratio KACT includes a sine wave signal component of the oscillation value frequency Fa.

Next, a first imbalance determination process will be explained with reference to FIG. 11. The first imbalance determination process is used to sample a primary frequency component and an oscillation value frequency component of the engine rotational speed NE included in the detected equivalent ratio KACT by using a bandpass filter algorithm, and by using the sampling result, and the first imbalance determination process is used to determine whether or not an imbalance condition of the air-fuel ratio is occurring, and is executed at the control period ΔT by the ECU 2.

Figure 11:
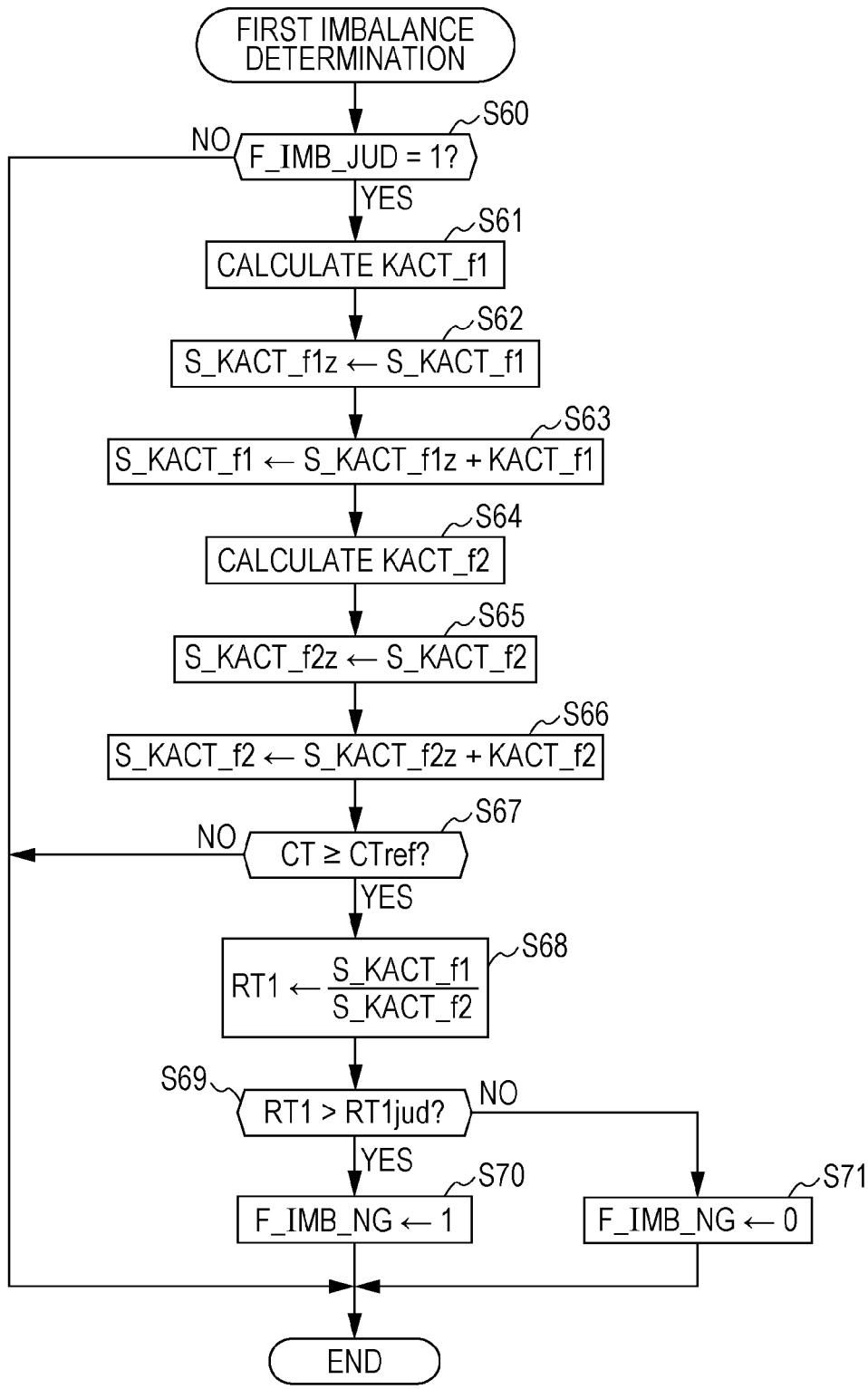
FIG. 11 is a flowchart illustrating a first imbalance determination process.

As illustrated in FIG. 11, initially in step 60, it is determined whether or not the imbalance determination flag F_IMB_JUD is "1". If the determination result is NO, the process is terminated immediately.

On the other hand, if the determination result is YES, and if the execution conditions of the imbalance determination process are fulfilled, the process proceeds to step 61 to calculate a first filter value KACT_f1 by using a bandpass filter algorithm as shown in the following formula 5.

$$KACT\_f1(k) = \alpha_1 \cdot KACT\_f1(k-1) + \alpha_2 \cdot KACT\_f1(k-2) + \ldots + \alpha_m \cdot KACT\_f1(k-m) + \beta_1 \cdot KACT(k) + \beta_2 \cdot KACT(k-1) + \ldots + \beta_n \cdot KACT(k-n) \quad (5)$$

In the formula 5, $\alpha_1$ to $\alpha_m$ and $\beta_1$ to $\beta_n$ are predetermined filter coefficients, and m and n are predetermined integer. In the bandpass filter algorithm of formula 5, the passband thereof is set to a frequency band having the primary frequency F1 of the engine rotational speed NE at the center, and thereby the first filter value KACT_f1 is calculated as a sampled value of the primary frequency component of the engine rotational speed NE.

Next, the process proceeds to step 62, and the previous value S_KACT_f1z of a first integrated value is set to a first integrated value S_KACT_f1 stored in the RAM.

Next, in step 63, the first integrated value S_KACT_f1 is set to the sum of the previous value S_KACT_f1z thereof and the first filter value KACT_f1 (S_KACT_f1z+ KACT_f1).

By using the same bandpass filter algorithm as the algorithm of formula 5 in step 64 following step 63, a second filter value KACT_f2 is calculated. In the bandpass filter algorithm used in step 64, the passband thereof is set to a frequency band having the oscillation value frequency Fa at the center, and thereby the second filter value KACT_f2 is calculated as a sampled value of the oscillation value frequency component.

Next, the process proceeds to step 65, and the previous value S_KACT_f2z of a second integrated value is set to a second integrated value S_KACT_f2 stored in the RAM.

Next, in step 66, the second integrated value S_KACT_f2 is set to the sum of the previous value S_KACT_f2z thereof and the second filter value KACT_f2 (S_KACT_f2z+ KACT_f2).

In step 67 following step 66, it is determined whether or not the counter value CT of the fluctuation control counter is equal to or larger than a predetermined value CTref. If the determination result is NO, the process is terminated immediately.

On the other hand, if the determination result is YES, and if the execution duration of the air-fuel ratio fluctuation control process reaches ΔT·CTref, it is determined that the imbalance determination needs to be executed, the process proceeds to step 68, and the first normalization value RT1 is set to a value obtained by dividing the first integrated value S_KACT_f1 by the second integrated value S_KACT_f2 (S_KACT_f1/S_KACT_f2).

Next, the process proceeds to step 69, and it is determined whether or not the first normalization value RT1 is equal to or larger than a predetermined first determination value RT1jud. If the determination result is YES, it is determined that an imbalance condition of the air-fuel ratio is generated, the process proceeds to step 70 in order to represent the imbalance condition generation, and after setting an imbalance generation flag F_IMB_NG to "1", the process is terminated.

On the other hand, if the determination result is NO in step 69, it is determined that no imbalance condition of the air-fuel ratio is generated, and the process proceeds to step 71 in order to represent the condition of no imbalance, and after setting the imbalance generation flag F_IMB_NG to "0", the process is terminated.

Next, a second imbalance determination process will be explained with reference to FIG. 12. The second imbalance determination process is used to sample a 0.5th-order frequency component and an oscillation value frequency component of the engine rotational speed NE included in the detected equivalent ratio KACT by using a bandpass filter algorithm as with the abovementioned first imbalance determination process, and by using the sampling result, and the second imbalance determination process is used to determine whether or not an imbalance condition of the air-fuel ratio is occurring. The second imbalance determination process is executed by the ECU 2 at a control period obtained by converting the 0.5th-order frequency F0.5 of the engine rotational speed NE to duration, that is, a control period 2·ΔT, which is twice the control period of the first imbalance determination process.

Figure 12:
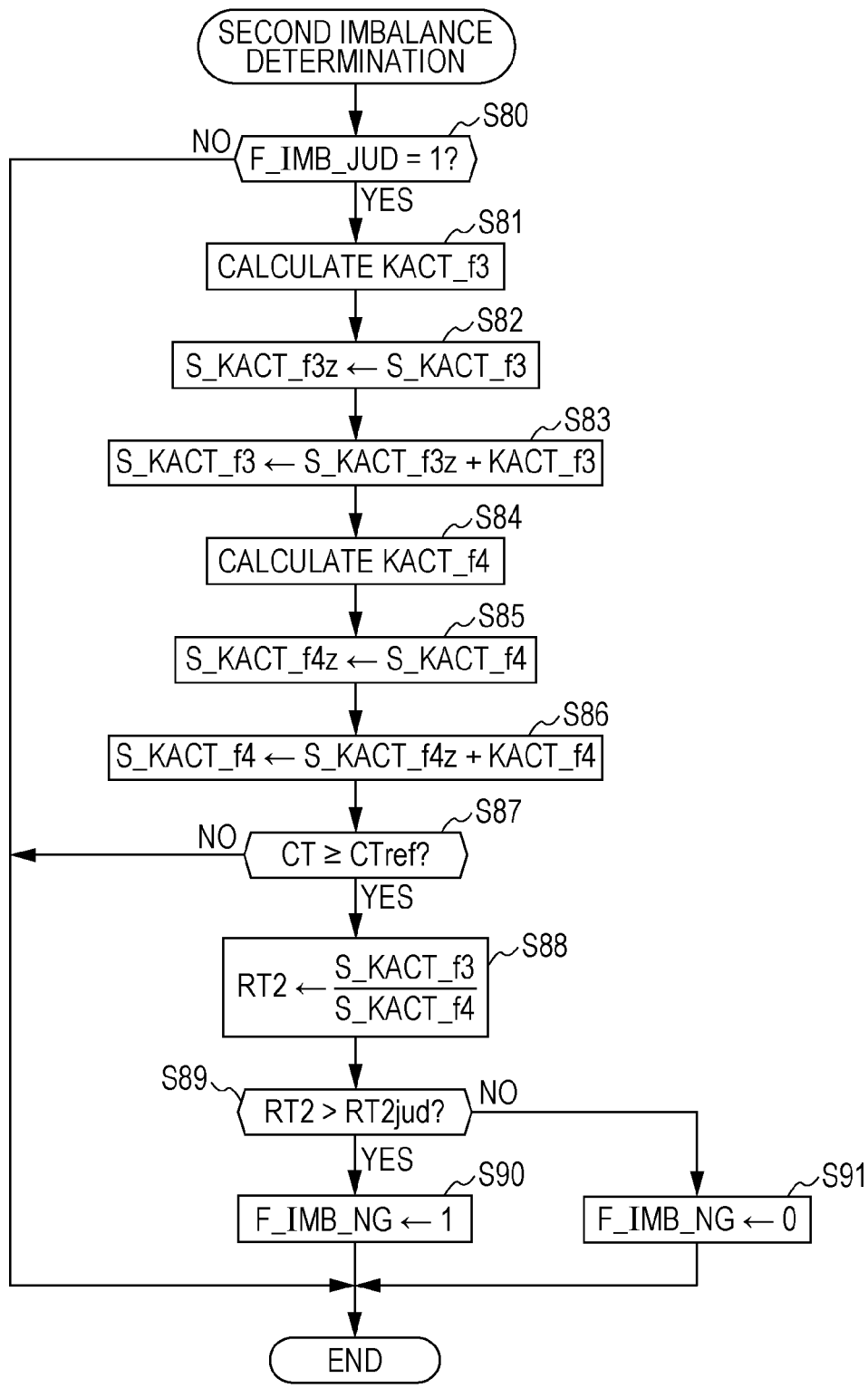
FIG. 12 is a flowchart illustrating a second imbalance determination process.

As illustrated in FIG. 12, initially in step 80, it is determined whether or not the imbalance determination flag F_IMB_JUD is "1". If the determination result is NO, the process is terminated immediately.

On the other hand, if the determination result in step 80 is YES, and if the execution conditions of the imbalance determination processes are fulfilled, the process proceeds to step 81 to calculate a third filter value KACT_f3 by using the same bandpass filter algorithm as formula 5. In the bandpass filter algorithm used in step 81, the passband thereof is set to a frequency band having the 0.5th-order frequency F0.5 of the engine rotational speed NE at the center, and thereby the third filter value KACT_f3 is calculated as a sampled value of the 0.5th-order frequency component of the engine rotational speed NE.

Next, the process proceeds to step 82, and the previous value S_KACT_f3z of a third integrated value is set to a third integrated value S_KACT_f3 stored in the RAM.

Next, in step 83, the third integrated value S_KACT_f3 is set to the sum of the previous value S_KACT_f3z thereof and the third filter value KACT_f3 (S_KACT_f3z+ KACT_f3).

By using the same bandpass filter algorithm as the algorithm of formula 5 in step 84 following step 83, a fourth filter value KACT_f4 is calculated. In the bandpass filter algorithm used in step 84, the passband thereof is set to a frequency band having the oscillation value frequency Fa at the center, and thereby the fourth filter value KACT_f4 is calculated as a sampled value of the oscillation value frequency component.

Next, the process proceeds to step 85, and the previous value S_KACT_f4z of a fourth integrated value is set to a fourth integrated value S_KACT_f4 stored in the RAM.

Next, in step 86, the fourth integrated value S_KACT_f4 is set to the sum of the previous value S_KACT_f4z thereof and the fourth filter value KACT_f4 (S_KACT_f4z+ KACT_f4).

In step 87 following step 86, it is determined whether or not the counter value CT of the fluctuation control counter is equal to or larger than a predetermined value CTref. If the determination result is NO, the process is terminated immediately.

On the other hand, if the determination result is YES, and if the execution duration of the air-fuel ratio fluctuation control process reaches ΔT·CTref, it is determined that the imbalance determination needs to be executed, the process proceeds to step 88, and the second normalization value RT2 is set to a value obtained by dividing the third integrated value S_KACT_f3 by the fourth integrated value S_KACT_f4 (S_KACT_f3/S_KACT_f4).

Next, the process proceeds to step 89, and it is determined whether or not the second normalization value RT2 is equal to or larger than a predetermined second determination value RT2jud. If the determination result is YES, it is determined that an imbalance condition of the air-fuel ratio is generated, the process proceeds to step 90 in order to represent the imbalance condition generation, and after setting an imbalance generation flag F_IMB_NG to "1", the process is terminated.

On the other hand, if the determination result is NO in step 89, it is determined that no imbalance condition of the air-fuel ratio is generated, and the process proceeds to step 91 in order to represent the condition of no imbalance, and after setting the imbalance generation flag F_IMB_NG to "0", the process is terminated.

If the imbalance generation flag F_IMB_NG is set to "1" in the first imbalance determination process or the second imbalance determination process, a warning lamp provided on an instrument panel (not shown) of the vehicle is illuminated to notify the driver of the imbalance condition generation.

As described above, the control apparatus 1 according to the present embodiment executes the air-fuel fluctuation control process in such a manner that the equivalent ratio of exhaust gas fluctuates following the oscillation value KCMD_i, and while the air-fuel ratio fluctuation control process is being executed, the imbalance determination processes of the air-fuel ratio are executed by using the detected equivalent ratio KACT calculated from detection signals of LAF sensor 23.

In this case, the imbalance determination processes are executed when the cylinder gas amount GCYL is equal to or larger than the gas amount determination value Gjud, and the gas amount determination value Gjud is increased as the wastegate valve opening WG increases. That is, even when the flow rate of exhaust gas to be supplied to the LAF sensor 23 via the turbine 10b is reduced due to a large wastegate valve opening WG, the imbalance determination processes are executed only under a condition in which the cylinder gas amount GCYL is large and the amount of the exhaust gas to be supplied to the LAF sensor 23 is large, and thereby reduction in the flow rate of exhaust gas due to an increase in the wastegate valve opening WG has no effect. That is, the imbalance determination processes are prohibited under a condition in which the flow rate of exhaust gas to be supplied to the LAF sensor 23, and consequently a good determination accuracy, can be maintained in the imbalance determination processes.

In addition, the LAF sensor 23 and the wastegate valve 11a are arranged in the exhaust passage 8 to have the positional relationship described above, and thereby, exhaust gas that has passed through the turbine 10b flows while being brought into direct contact with the LAF sensor 23, whereas exhaust gas that has passed through the wastegate valve 11a flows with little or no contact with the LAF sensor 23. Therefore, in contrast to the layout where a LAF sensor is provided downstream of a wastegate valve 11a as proposed in Japanese Patent No. 4952847, in the present embodiment, an effect of the exhaust gas that has passed through the wastegate valve 11a can be avoided, and thereby a primary frequency component, an oscillation value frequency component, and a 0.5th-order order frequency component can be sampled from the detected equivalent ratio KACT with good accuracy, even in a range where the wastegate valve opening WG is relatively large, and the determination accuracy of the imbalance determination processes can be further improved. As a result, merchantability is improved.

Note that, in the present embodiment, the LAF sensor 23 is used as an exhaust gas concentration parameter sensor, however, the exhaust gas concentration parameter sensor of the present application is not limited thereto, and may be any sensor that detects an exhaust gas concentration parameter indicating the concentration of a predetermined component, including oxygen, in the exhaust gas. For example, a typical oxygen concentration sensor and a NOx sensor that invert output signals may be used as the exhaust gas concentration parameter sensor.

In the present embodiment, the LAF sensor 23, as an exhaust gas concentration parameter sensor, is arranged in the vicinity of the wastegate valve 11a, that is, in the vicinity of a merging position at which a downstream end of the bypass passage 8a merges with the exhaust passage 8, however, the LAF sensor 23 may be installed upstream of the merging section of the exhaust passage 8, that is, a position closer to the turbine 10b. In this case, in contrast to the layout proposed in Japanese Patent No. 4952847, the LAF sensor 23 can more surely avoid the influence of the exhaust gas that has passed through the wastegate valve 11a, and thereby the effects of the present embodiment can be surely obtained.

Furthermore, in the present embodiment, the calculation program for calculating a cylinder gas amount GCYL is used as the cylinder gas amount parameter acquisition unit, however, the cylinder gas amount parameter acquisition unit of the present application is not limited thereto, and may be any feature that can acquire a cylinder gas amount parameter representing a cylinder gas amount. A calculation program for calculating a cylinder gas amount by using a physical model or a calculation program for calculating a cylinder gas amount by using a neural network model described in, for example, Japanese Unexamined Patent Application Publication No. 2012-2184, the entire contents of which are incorporated herein by reference, may be used as a cylinder gas amount acquisition unit. In addition, a cylinder gas amount may be calculated by using a detection signal received from a sensor, such as an airflow sensor.

Meanwhile, in the present embodiment, imbalance determination of the engine 3 is performed as determination of the operation status of the internal combustion engine or an auxiliary device thereof, however, the determination of the operation status of the internal combustion engine or an auxiliary device thereof is not limited thereto, and may be any feature that determines the operation status of the internal combustion engine or an auxiliary device thereof.

For example, as determination of the operation status of an auxiliary device, determination of the deterioration status of the LAF sensor 23 may be performed by determining a response lag on the basis of a detection signal of the LAF sensor 23. In addition, as determination of the operation status of another auxiliary device, determination of the deterioration status of the exhaust gas purification catalyst 9 may be performed by installing an oxygen concentration sensor downstream of the exhaust gas purification catalyst 9, and by calculating the oxygen storage capacity OSC of the exhaust gas purification catalyst 9 by using detection signals received from the LAF sensor 23 and the oxygen concentration sensor.

The control apparatus of the present application is applied to an internal combustion engine for a vehicle, however, the control apparatus of the present application can be applied to an internal combustion engine for a ship or an internal combustion engine for another industrial device.

According to an aspect of an embodiment, a control apparatus for an internal combustion engine provided with a turbocharger having a turbine provided in an exhaust passage, and a wastegate valve that changes kinetic energy received by the turbine from exhaust gas by opening/closing a bypass passage for bypassing the turbine of the turbocharger, includes an exhaust gas concentration parameter sensor that is provided downstream of the turbine in the exhaust passage and that detects an exhaust gas concentration parameter which indicates a concentration of a predetermined component, including oxygen, in the exhaust gas, a cylinder gas amount parameter acquisition unit that acquires a cylinder gas amount parameter which indicates an amount of a cylinder gas in a cylinder of the internal combustion engine, an air-fuel ratio control unit that performs an air-fuel ratio fluctuation control process for controlling an air-fuel ratio of the internal combustion engine to fluctuate in a predetermined manner, an operation status determination unit that determines an operation status of the internal combustion engine or an auxiliary device of the internal combustion engine by using the detected exhaust gas concentration parameter when the cylinder gas amount indicated by the acquired cylinder gas amount parameter is equal to or larger than a predetermined determination value, while the air-fuel ratio fluctuation control process is being performed, and a determination value setting unit that sets the predetermined determination value to a larger value as the opening WG of the wastegate valve becomes larger.

The control apparatus for an internal combustion engine according to the present aspect, the air-fuel ratio of the internal combustion engine is controlled to fluctuate in a predetermined manner, and an operation status of the internal combustion engine or an auxiliary device of the internal combustion engine is determined by using the detected exhaust gas concentration parameter when the cylinder gas amount indicated by the acquired cylinder gas amount parameter is equal to or larger than a predetermined determination value, while the air-fuel ratio fluctuation control process is being performed. Furthermore, the predetermined determination value is set to a larger value as the opening of the wastegate valve becomes larger, and thereby the operation status determination is performed only in a condition in which the cylinder gas amount is large and the flow rate of the exhaust gas is large in a range where the opening of the wastegate valve is large. Consequently, even in a case where the flow rate of the exhaust gas supplied to the exhaust gas concentration parameter sensor is reduced due to large opening of the wastegate valve, the cylinder gas amount becomes large, and thereby the exhaust gas concentration parameter can be detected with high accuracy while influence of reduction in the exhaust gas amount is being suppressed. Therefore, in contrast to the feature proposed in Japanese Patent No. 4952847, the control apparatus for an internal combustion engine according to the present aspect is capable of determining the operation status of the internal combustion engine or an auxiliary device thereof with high accuracy by using an exhaust gas concentration parameter that is detected with high accuracy, even in a range where the opening of the wastegate valve is large. As a result, merchantability is improved.

It is preferable that, in the control apparatus for the internal combustion engine according to the present aspect, the exhaust gas concentration parameter sensor be installed in a vicinity of a merging position at which a downstream end of the bypass passage merges with the exhaust passage, or upstream of the merging position.

In this case, the exhaust gas concentration parameter sensor is installed in a vicinity of a merging position at which a downstream end of the bypass passage merges with the exhaust passage, or upstream of the merging position, and thereby the control apparatus for an internal combustion engine is hardly affected by changes in the opening of the wastegate valve. As a result, the operation status of the internal combustion engine or an auxiliary device thereof can be determined with even higher accuracy, and thereby merchantability can be further improved.

Obviously, numerous modifications and variations of the present invention are possible in light of the above teachings. It is therefore to be understood that within the scope of the appended claims, the invention may be practiced otherwise than as specifically described herein.

What is claimed is:

1. A control apparatus for an internal combustion engine provided with a turbocharger having a turbine provided in an exhaust passage, and a wastegate valve that changes kinetic energy received by the turbine from exhaust gas by opening/closing a bypass passage for bypassing the turbine of the turbocharger, the control apparatus comprising:

an exhaust gas concentration parameter sensor that is provided downstream of the turbine in the exhaust passage and that detects an exhaust gas concentration parameter which indicates a concentration of a predetermined component, including oxygen, in the exhaust gas; and an electronic control unit configured to:
  acquire a cylinder gas amount parameter which indicates an amount of a cylinder gas in a cylinder of the internal combustion engine,
  perform an air-fuel ratio control process for controlling an air-fuel ratio of the internal combustion engine to oscillate in a predetermined manner,
  determine an operation status of the internal combustion engine or an auxiliary device of the internal combustion engine by using the detected exhaust gas concentration parameter in response to a determination that the cylinder gas amount indicated by the acquired cylinder gas amount parameter is equal to or larger than a predetermined determination value, while the air-fuel ratio fluctuation control process is being performed, and
  set the predetermined determination value to a larger value as the opening of the wastegate valve becomes larger.

2. The control apparatus for an internal combustion engine according to claim 1,
wherein the exhaust gas concentration parameter sensor is installed in an area of the exhaust passage that includes a merging position at which a downstream end of the bypass passage merges with the exhaust passage, or upstream of the merging position.

3. The control apparatus for an internal combustion engine according to claim 2,
wherein the wastegate valve is provided at the merging position.

4. The control apparatus for an internal combustion engine according to claim 1,
wherein the operation status of the internal combustion engine or the auxiliary device is an imbalance of the internal combustion engine, a deterioration status of the exhaust gas concentration parameter sensor, or a deterioration status of an exhaust gas purification catalyst.

5. The control apparatus for an internal combustion engine according to claim 1,
wherein the exhaust gas concentration parameter sensor is provided downstream of the turbine of the turbocharger.

6. The control apparatus for an internal combustion engine according to claim 1,
wherein the control unit is configured to determine whether an imbalance condition of the air-fuel ratio in the internal combustion engine is occurring.

7. A control apparatus for an internal combustion engine, comprising:
an exhaust gas concentration parameter sensor provided in an exhaust passage to detect an exhaust gas concentration parameter which represents a concentration of a predetermined component including oxygen in an exhaust gas; and
an electronic control unit configured to:
  acquire a cylinder gas amount parameter which represents an amount of a cylinder gas in a cylinder of the internal combustion engine which includes a turbocharger having a turbine provided in the exhaust passage and which includes a wastegate valve to open or close a bypass passage to bypass the turbine of the turbocharger so as to change kinetic energy transmitted from the exhaust gas to the turbine,
  perform an air-fuel ratio control to control an air-fuel ratio in the internal combustion engine to oscillate in a predetermined state,
  determine an operation status of the internal combustion engine or an auxiliary device of the internal combustion engine based on the exhaust gas concentration parameter detected by the exhaust gas concentration parameter sensor following a determination that the amount of the cylinder gas represented by the cylinder gas amount parameter acquired by the cylinder gas amount parameter acquisition device is equal to or larger than a predetermined determination value while the air-fuel ratio control is being performed, and
  increase the predetermined determination value as an opening of the wastegate valve increases.

8. The control apparatus according to claim 7,
wherein the exhaust gas concentration parameter sensor is provided downstream of the turbine of the turbocharger.

9. The control apparatus according to claim 8,
wherein the exhaust gas concentration parameter sensor is installed in an area of the exhaust passage that includes a merging position at which a downstream end of the bypass passage merges with the exhaust passage, or upstream of the merging position.

10. The control apparatus according to claim 9,
wherein the wastegate valve is provided at the merging position.

11. The control apparatus according to claim 7,
wherein the control unit is configured to determine whether an imbalance condition of the air-fuel ratio in the internal combustion engine is occurring.

12. The control apparatus according to claim 7,
wherein the operation status of the internal combustion engine or the auxiliary device is an imbalance of the internal combustion engine, a deterioration status of the exhaust gas concentration parameter sensor, or a deterioration status of an exhaust gas purification catalyst.

13. A control apparatus for an internal combustion engine, the control apparatus comprising:
an exhaust gas concentration parameter sensor disposed in an exhaust passage that is configured to detect an exhaust gas concentration parameter which corresponds to a concentration of a predetermined component in the exhaust gas; and
an electronic control unit configured to:
  acquire a cylinder gas amount parameter which corresponds to an amount of a cylinder gas in a cylinder of the internal combustion engine,
  perform an air-fuel ratio control process for controlling an air-fuel ratio of the internal combustion engine to oscillate in a predetermined manner,
  determine an operation status of the internal combustion engine or an auxiliary device of the internal combustion engine by using the detected exhaust gas concentration parameter in response to a determination that the cylinder gas amount indicated by the acquired cylinder gas amount parameter is equal to or larger than a predetermined determination value, while the air-fuel ratio control process is being performed, and
  set the predetermined determination value to a larger value as the opening of the wastegate valve becomes larger.

* * * * *